(12) United States Patent
Chuang et al.

(10) Patent No.: US 7,426,252 B1
(45) Date of Patent: Sep. 16, 2008

(54) HIGH SPEED TRANSCEIVER RECEIVING LOWER RATE DATA

(75) Inventors: Jerry Chuang, Sunnyvale, CA (US); Dai Huang, Cupertino, CA (US)

(73) Assignee: XILINX, Inc., San Jose, CA (US)

( * ) Notice: Subject to any disclaimer, the term of this patent is extended or adjusted under 35 U.S.C. 154(b) by 799 days.

(21) Appl. No.: 10/930,579

(22) Filed: Aug. 31, 2004

Related U.S. Application Data

(63) Continuation-in-part of application No. 10/771,210, filed on Feb. 3, 2004.

(51) Int. Cl.
*H04L 7/00* (2006.01)
*H04B 1/38* (2006.01)

(52) U.S. Cl. .................................. 375/355; 375/219
(58) Field of Classification Search ................ 375/219, 375/354, 355
See application file for complete search history.

(56) References Cited

U.S. PATENT DOCUMENTS

| | | | |
|---|---|---|---|
| 4,280,224 A | 7/1981 | Chethik | |
| 4,933,959 A | 6/1990 | Knechtel | |
| 6,128,680 A | 10/2000 | Sallee | |
| 6,711,221 B1 | 3/2004 | Belotserkovsky et al. | |
| 7,089,444 B1 * | 8/2006 | Asaduzzaman et al. | 713/600 |
| 7,167,534 B2 | 1/2007 | Nakamura | |
| 7,197,098 B2 * | 3/2007 | Johnson | 375/371 |
| 7,257,183 B2 | 8/2007 | Dally et al. | |
| 2003/0190006 A1 | 10/2003 | Nagano | |
| 2006/0062327 A1 | 3/2006 | Dally | |

OTHER PUBLICATIONS

U.S. Appl. No. 10/771,210, filed Feb. 3, 2004, Huang.
Xilinx, Inc.; "Data Recovery," Nick Sawyer, Application Note XAPP224 (v2.3), Mar. 4, 2004, pp. 1-7, available from Xilinx, Inc. 2100 Logic Drive, San Jose, CA 95124.
Razavi, Behzad, Monolithic Phase-Locked Loops and Clock Recovery Circuits, Theory and Design, IEEE Press, 1996, Part 5. AT&T Bell Laboratories, 11 pages, ISBN 0-7803-1149-3.
UG024, "RocketIO Transceiver User Guide", Feb. 22, 2007, Xilinx, Inc. 2100 Logic Drive, San Jose, CA 95124.
U.S. Appl. No. 11/035,613, filed Jan. 14, 2005, Bataineh, Khaldoun, et al., entitled, "Receiver Operable to Receive Data at a Lower Data Rate", Xilinx, Inc. 2100 Logic Drive, CA. 95124.

(Continued)

*Primary Examiner*—David B Lugo
(74) *Attorney, Agent, or Firm*—Timothy W. Markison

(57) ABSTRACT

A high speed transceiver operable to receive lower data rate transmissions includes an oversampling module, an aligning module, a selecting module, and a memory module. The oversampling module is operably coupled to oversample an n-bit data word at an oversampling rate of m to produce an m by n bit oversampled data word, wherein the n-bit data word is received at a first data transmission rate that is less than a serial bit rate of the high speed transceiver. The transition boundary module is operably coupled to determine transition boundary data of the m by n bit oversampled data word in accordance with a clock of the high speed transceiver to produce transition boundary data. The selecting module is operably coupled to select representative bits in accordance with the transition boundary data to produce a recovered data word. The memory module is operably coupled to store the recovered data word.

23 Claims, 14 Drawing Sheets

OTHER PUBLICATIONS

Razavi, Behzad, Monolithic Phase-Locked Loops and Clock Recovery Circuits, Theory and Design, IEEE Press, 1996, Part 5. AT&T Bell Laboratories, 11 pages, ISBN 0-7803-1149-3.

UG024, "RocketIO Transceiver User Guide", Feb. 22, 2007, Xilinx, Inc. 2100 Logic Drive, San Jose, CA 95124.

* cited by examiner programmable logic device 10 high speed transceiver 20 high speed transceiver 20 high speed transceiver 20 example of 10-bit bus width
adjust for 7-bit oversampled data example of edge detection

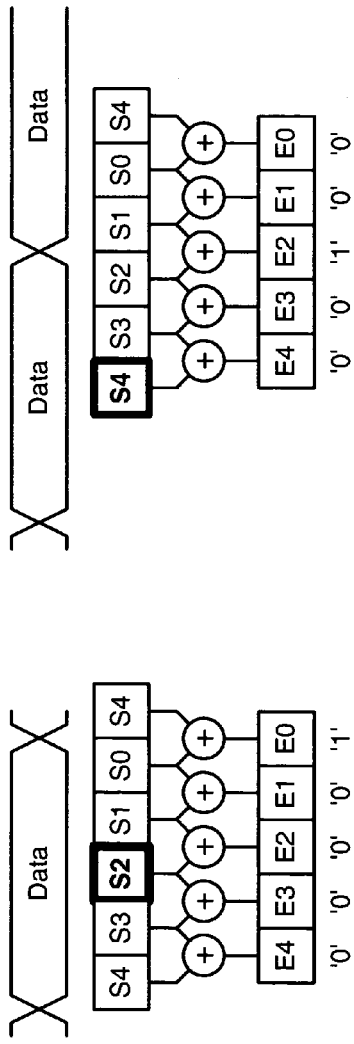
FIG. 8A
example of vector approach
sample point detection
FIG. 8B
example of vector approach
sample point detection
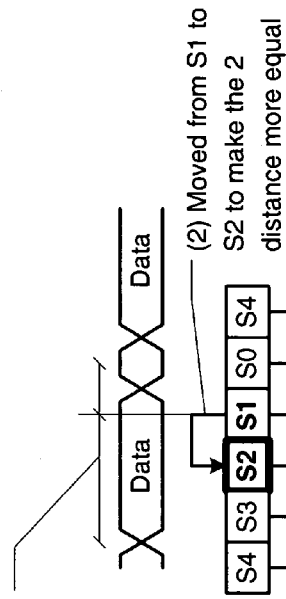
(1) Distance from assume position (S1) to new transition edges are measured.
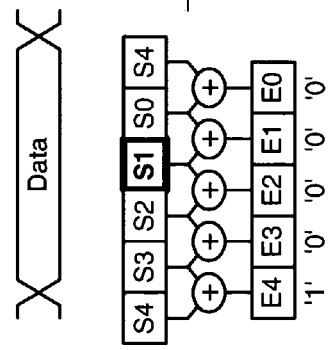
(2) Moved from S1 to S2 to make the 2 distance more equal
FIG. 9
example of vector approach
with data jitter example of 1st transition approach
to sample point detection data selection multiplexer set up for 3X
oversampling of selecting module 44

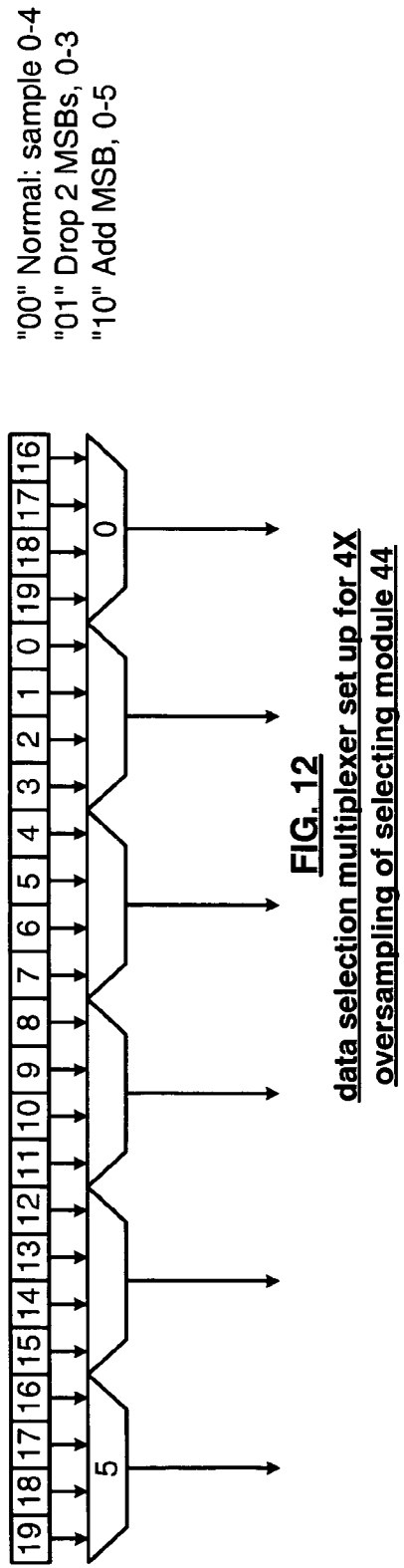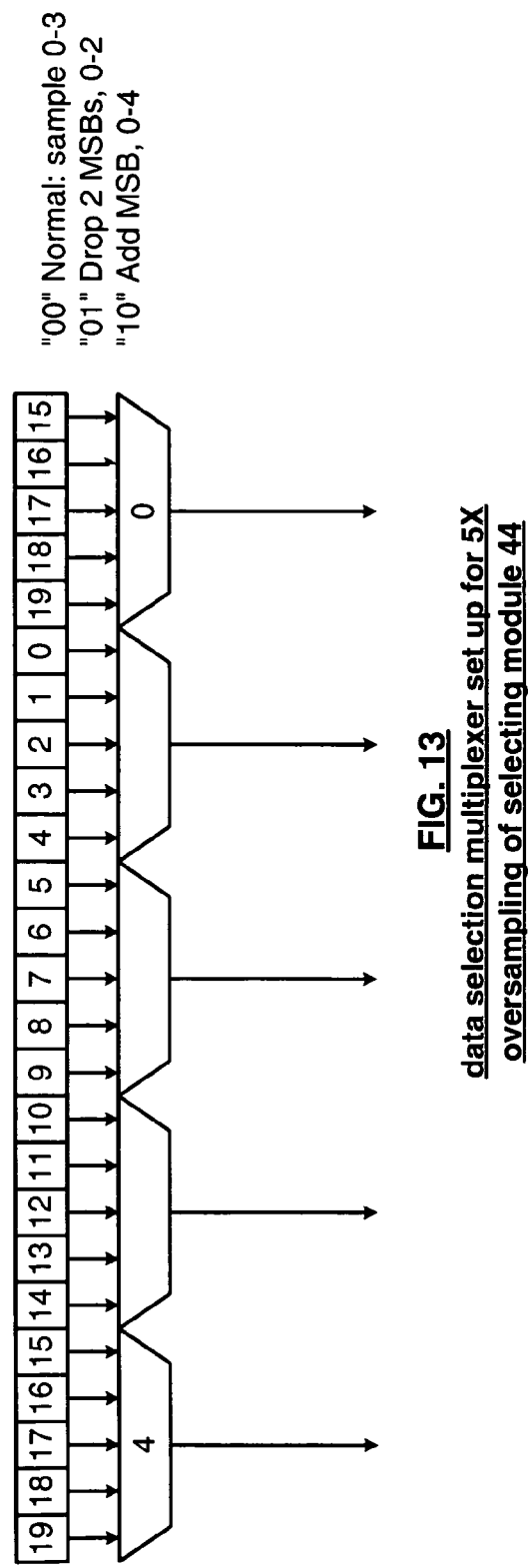
FIG. 12
data selection multiplexer set up for 4X oversampling of selecting module 44
"00" Normal: sample 0-4
"01" Drop 2 MSBs, 0-3
"10" Add MSB, 0-5
FIG. 13
data selection multiplexer set up for 5X oversampling of selecting module 44
"00" Normal: sample 0-3
"01" Drop 2 MSBs, 0-2
"10" Add MSB, 0-4 data selection multiplexer set up for 6X oversampling of selecting module 44

"00" Normal: sample 0-3
"01" Drop MSB, 0-2

3X oversampling sample selection with data drift

5X oversampling sample selection with data drift memory module 46

HIGH SPEED TRANSCEIVER RECEIVING LOWER RATE DATA

CROSS-REFERENCE TO RELATED APPLICATION

This patent application is claiming priority under 35 USC § 120 as a continuation in part of co-pending patent application entitled "HIGH SPEED TRANSCEIVER OPERABLE TO RECEIVE LOWER DATA RATE TRANSMISSIONS" by Huang, having a Ser. No. 10/771,210, and filing date of Feb. 3, 2004, which is hereby incorporated herein in its entirety.

TECHNICAL FIELD OF THE INVENTION

This invention relates generally to integrated circuits and more particularly to high speed transceivers.

DESCRIPTION OF RELATED ART

As is known, a transceiver includes a serializer and a deserializer (SERDES) that performs serial-to-parallel data conversions and parallel-to-serial data conversions between high-speed serial interfaces and parallel data interfaces in a full duplex manner. In general, the serializer converts parallel data from a parallel data interface into a serial data stream that is provided to a high-speed serial data interface. Conversely, the deserializer converts serial data from a high-speed serial data interface into parallel data that is provided to a parallel data interface. The serial data processed by the serializer and the deserializer may be scrambled data streams or encoded data streams.

One technique for producing an encoded data stream is 8 B/10 B coding. As is known, 8 B/10 B encoding involves converting 8 bits of data into a 10 bit character and 8 B/10 B decoding involves recovering the 8 bits of data from a 10 bit character. As is further known, 8 B/10 B coding provides sufficient signal transitions and a DC balance in the data stream, both of which are necessary for proper operation of a phase locked loop (PLL). With such a coding scheme, the 10 bit characters offer four times the number of characters of the 8-bits of data such that special 10 bit characters may be defined for link level controls such as a synchronous character (which is sometimes referred to as a comma character) and framing characters. As is known, transceivers use comma characters to identify transmission-character boundaries so that word boundaries in a serial data stream are properly recovered at the parallel data interface. As such, transceivers that employ 8 B/10 B coding including a comma detection and alignment circuit to detect the comma character and to align the 10 bit characters.

As is also known, transceivers may be embedded in a programmable logic device and operate over a serial bit rate range (e.g., 600 Mega bits per second (Mbps) to 3.125 Giga bits per second (Gbps)). However, some input/output (I/O) serial interfaces require data transmission rates well below the clock data recovery range of the phase locked loop of the transceiver. For example, Enterprise System CONnection (ESCON) and Single-Bit Command Code Sets CONnection (SBCON) each have data rates as low as 200 Mbps, Fiber Channel has data rate requirements of 133 Mbps, 266 Mbps, and 531 Mbps, and DVB-ASI has a data rate requirement of 270 Mbps.

To enable a transceiver to receive lower data rates than its serial bit rate range, the transceiver may use an oversampling technique, such that each serial bit is replicated multiple times. With each bit of the data stream replicated multiple times, each bit of the comma character is also replicated multiple times, which requires a special comma detection circuit for oversampled lower speed data streams. As such, each transceiver has two comma detect circuits: one for normal use, i.e., data rates within the designed serial bit rate range, and one for lower speed data streams. Further, the transceiver also includes two alignment circuits: one for normal data rates and the other for the lower speed data streams. Typically, the extra comma detection circuit and alignment circuit are implemented external to the transceiver module, which adds to the complexity and cost of using such programmable logic devices.

Further, by implementing the comma detection and alignment external to the transceiver for lower data rates, the receiving elastic storage and clock correction of the transceiver are unusable since they are designed for normal operation. As is known, the clock/data recovery circuit of the transceiver extracts clock phase and frequency from the incoming data stream, hereafter referred to as recovered clock, which reflects the data rate of the incoming data. As is known, transceivers also have user clock at the parallel interface that defines the rate which the user logic consumes the data. The recovered clock and the user clock typically have different sources, and one of the clocks may be faster than the other. As is known, the elastic storage and clock correction of the transceiver compensate for slight differences in the clock rates of the recovered clock and the user clock of transceivers. As is known, clock correction logic coupled to the elastic storage requires the comma alignment achieved beforehand so that the clock correction sequence can be recognized and manipulated. If the comma detection and alignment circuit is implemented external to the transceiver, the clock correction and elastic storage circuit must be implemented external to the transceiver. As such, if clock correction is desired for lower data rates, an external elastic storage device and clock correction circuitry need to be employed, which further adds to the complexity and cost of using such programmable logic devices.

As is known, the recovered clock needs to drive comma detection, comma alignment, clock correction and elastic storage circuits. If the clock correction and elastic storage circuit are implemented externally, the recovered clock must be brought out to the external components, which further complicates the clocking scheme in the system and adds to the complexity and cost of using such programmable logic devices.

Therefore, a need exists for a high speed transceiver that is operable to receive lower rate data streams with minimal external components, thereby reducing the complexity and associated costs of using programmable logic devices.

BRIEF SUMMARY OF THE INVENTION

The high speed transceiver operable to receive lower data rate transmissions of the present invention substantially meets these need and others. In one embodiment, a method for using a high speed transceiver to receive lower data rate transmissions begins by receiving an n-bit data word at a first data transmission rate, wherein the first data transmission rate is less than a serial bit rate of the high speed transceiver. The method continues by oversampling the n-bit data word at an oversampling rate of m to produce an m by n bit oversampled data word. The method continues by determining transition boundary data of the m by n bit oversampled data word in accordance with a clock of the high speed transceiver to produce transition boundary data. The method continues by selecting representative bits in accordance with the transition boundary data to produce a recovered data word. The method continues by storing the recovered data word.

In another embodiment, a high speed transceiver operable to receive lower data rate transmissions includes an oversampling module, a transition boundary module, a selecting module, and a memory module. The oversampling module is operably coupled to oversample an n-bit data word at an oversampling rate of m to produce an m by n bit oversampled data word, wherein the n-bit data word is received at a first data transmission rate, wherein the first data transmission rate is less than a serial bit rate of the high speed transceiver. The transition boundary module is operably coupled to determine transition boundary data of the m by n bit oversampled data word with a clock of the high speed transceiver to produce transition boundary data. The selecting module is operably coupled to select representative bits in accordance with the transition boundary data to produce a recovered data word. The memory module is operably coupled to store the recovered data word.

BRIEF DESCRIPTION OF THE DRAWINGS

FIGS. 8A and 8B are diagrams of example of a vector approach to determining the sampling point in accordance with the present invention;

FIG. 9 is another diagram of an example of a vector approach to determining the sampling point in accordance with the present invention;

FIG. 12 is a schematic block diagram of a 4× oversampling data selection multiplexer of a selecting module in accordance with the present invention;

FIG. 13 is a schematic block diagram of a 5× oversampling data selection multiplexer of a selecting module in accordance with the present invention;

DETAILED DESCRIPTION OF THE INVENTION

Figure 1:
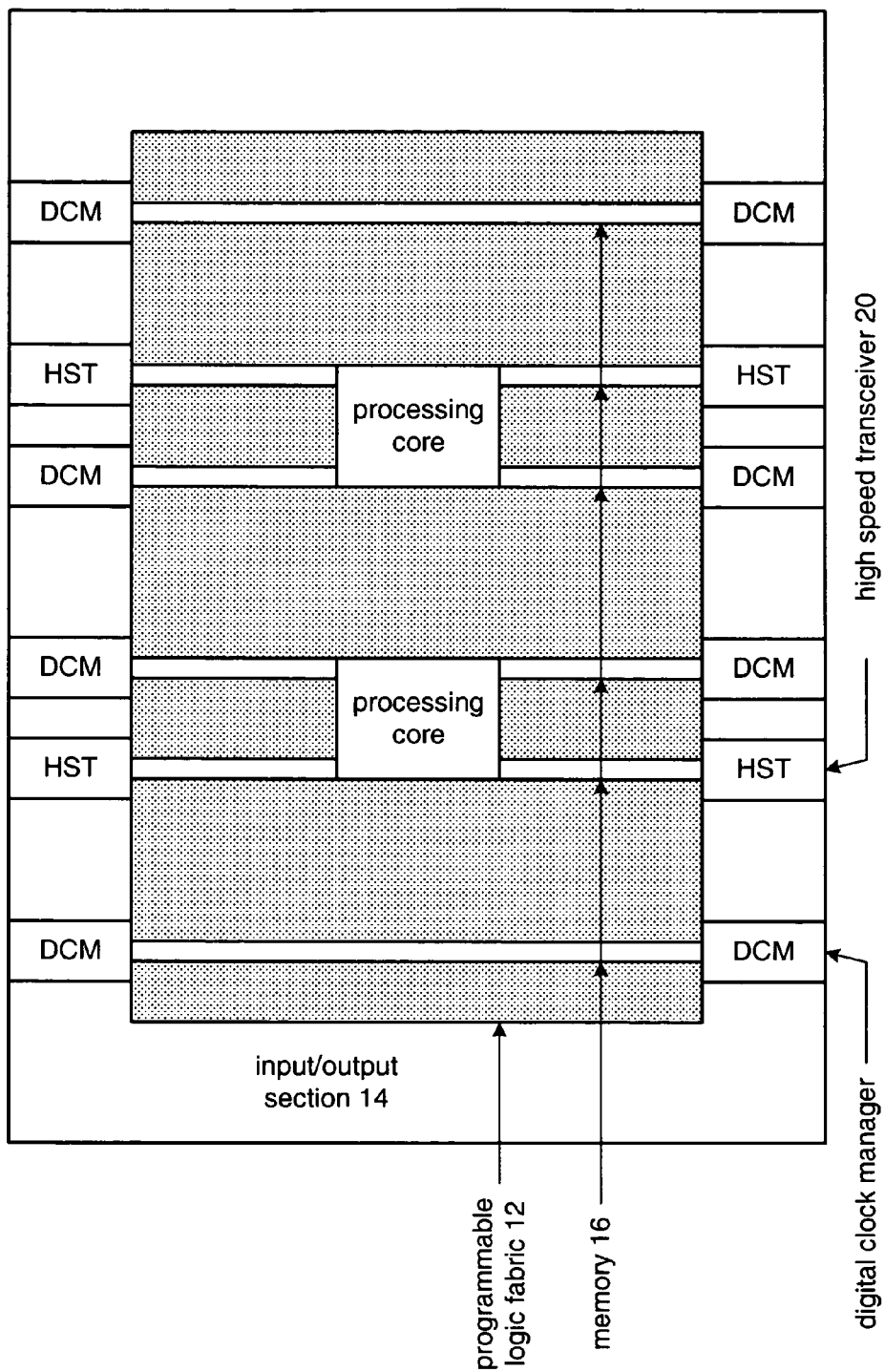
FIG. 1 is a schematic block diagram of a programmable logic device in accordance with the present invention.

FIG. 1 is a schematic block diagram of a programmable logic device 10 that includes a programmable logic fabric 12, an input/output section 14 and memory 16. The programmable logic fabric 12 may include one or more processing cores and programmable logic circuitry that may be implemented as programmable logic arrays (PLA), programmable array logic (PAL) devices, erasable programmable logic devices (EPLD), and/or programmable gate arrays (PGA). The input/output section 14 includes one or more digital clock managers (DCM) and one or more high-speed transceivers (HST) 20, which may be multi-gigabit transceivers (MGT) operable to provide serial-to-parallel and parallel-to-serial conversions for data inputted to and outputted from the programmable logic device 10.

Figure 2:
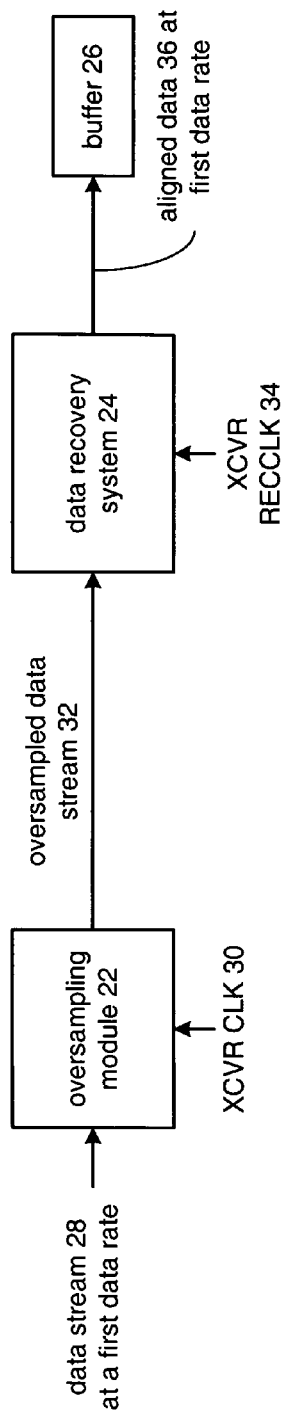
FIG. 2 is a schematic block diagram of a high-speed transceiver in accordance with the present invention.

FIG. 2 is a schematic block diagram of a high-speed transceiver 20 that is operable to receive lower data rate transmissions than its corresponding serial bit rate. The high-speed transceiver 20 includes an oversampling module 22, a data recovery system 24 and a buffer 26. The oversampling module 22 is operably coupled to receive a data stream 28 at a $1^{st}$ data rate, which is less than the transceiver serial bit rate. The serial bit rate of the transceiver is implied by the transceiver clock (XCVR CLK) 30. For example, the transceiver clock 30 may be set within a range of 50 MHz to 156.25 MHz to support any serial bit rate in the range of 600 to 3125 Mbps and the $1^{st}$ data rate may correspond to bit rates in the range of 83 Mbps to 1040 Mbps. As an alternative example the transceiver clock 30 may be adjustable between 60 and 100 MHz to support serial bit rates in the range of 1200-2000 Mbps.

The particular oversampling rate (m) used by the oversampling module 22 is based on the ratio between the serial bit rate of the transceiver and the $1^{st}$ data rate of the data stream 28. For example, the oversampling rate may be 4, 8, 10, et cetera, plus or minus a constant that is less than or equal to m/2. Based on the oversampling rate, the oversampling module 22 produces an oversampled data stream 32 from data stream 26. The oversampling module 22 also extracts clock phase and frequency from the incoming data stream, hereafter referred to as the recovered clock (XCVR RECCLK) 34, which reflects the data rate of the oversampled data stream.

The data stream 28 may include a unique alignment sequence and a data section that includes a plurality of data words. The unique alignment sequence is used by the transceiver to align data recovery with the boundaries of the data words within the data segment 30. For instance, the data stream 28 may include an 8 B/10 B encoded comma-character as the unique alignment sequence and the data may include 8 B/10 B encoded data.

The oversampled data stream 32 may include an oversampled unique alignment sequence and oversampled data. For example, if the oversampling rate is 4, each bit of the unique alignment sequence will be replicated 4 times in the oversampled unique alignment sequence. Similarly, each bit of the data segment will be replicated 4 times in the oversampled data section.

The data recovery system 24 receives the oversampled data stream 32 and, based on the recovered clock 34, identifies the boundaries of the data words to produce the aligned data 36 at the $1^{st}$ data rate. The aligned data 36 corresponds to the data words, which may be stored in buffer 26 and subsequently retrieved therefrom. For a more complete discussion of the operation of the high speed transceiver of FIG. 2 refer to the above referenced co-pending patent application entitled "HIGH SPEED TRANSCEIVER OPERABLE TO RECEIVE LOWER DATA RATE TRANSMISSIONS", having a Ser. No. 10/771,210, and filing date of Feb. 3, 2004.

Figure 3:
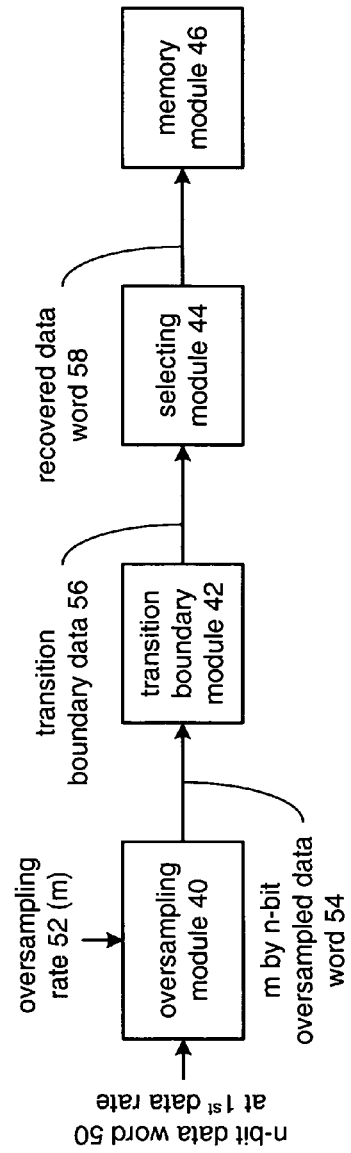
FIG. 3 is a schematic block diagram of another high speed transceiver in accordance with the present invention.

FIG. 3 is a schematic block diagram of another embodiment of a high speed transceiver 20 that includes an oversampling module 40, a transition boundary module 42, a selecting module 44, and a memory module 46.

In operation, the oversampling module 40 oversamples an n-bit data word 50 based on an oversampling rate 52 ($m$) to produce an m by n-bit oversampled data word 54. The n-bit data word 50 is received at a first data rate, which is lower than the transceiver line rate of the high speed transceiver 20 (e.g., multiples of the XCVR CLK 30), includes at least two bits, and may be a word within data stream 28. The oversampling rate (m) 52 is dependent on the ratio between the serial bit rate of the transceiver and the $1^{st}$ data rate.

The transition boundary module 42 determines transition boundary data (e.g., transitions from 1 to 0 and 0 to 1) of the m by n-bit oversampled data word 54 according to the clock of the high speed transceiver (e.g., XCVR CLK 30) to produce transition boundary data 56. The transition boundary module 42 will be described in greater detail with reference to FIGS. 4-10.

The selecting module 44 selects representative bits from the m by n oversampled data word 54 based on the transition boundary data 56 to produce a recovered data word 58. The memory module 46 stores the recovered data word 58, which may be n-bits, n–1 bits, n+1 bits, etc. The selecting module 44 will be described in greater detail with reference to FIGS. 4, 5, and 11-16. The memory module 46 will be described in greater detail with reference to FIGS. 4, 5, and 17.

Figure 4:
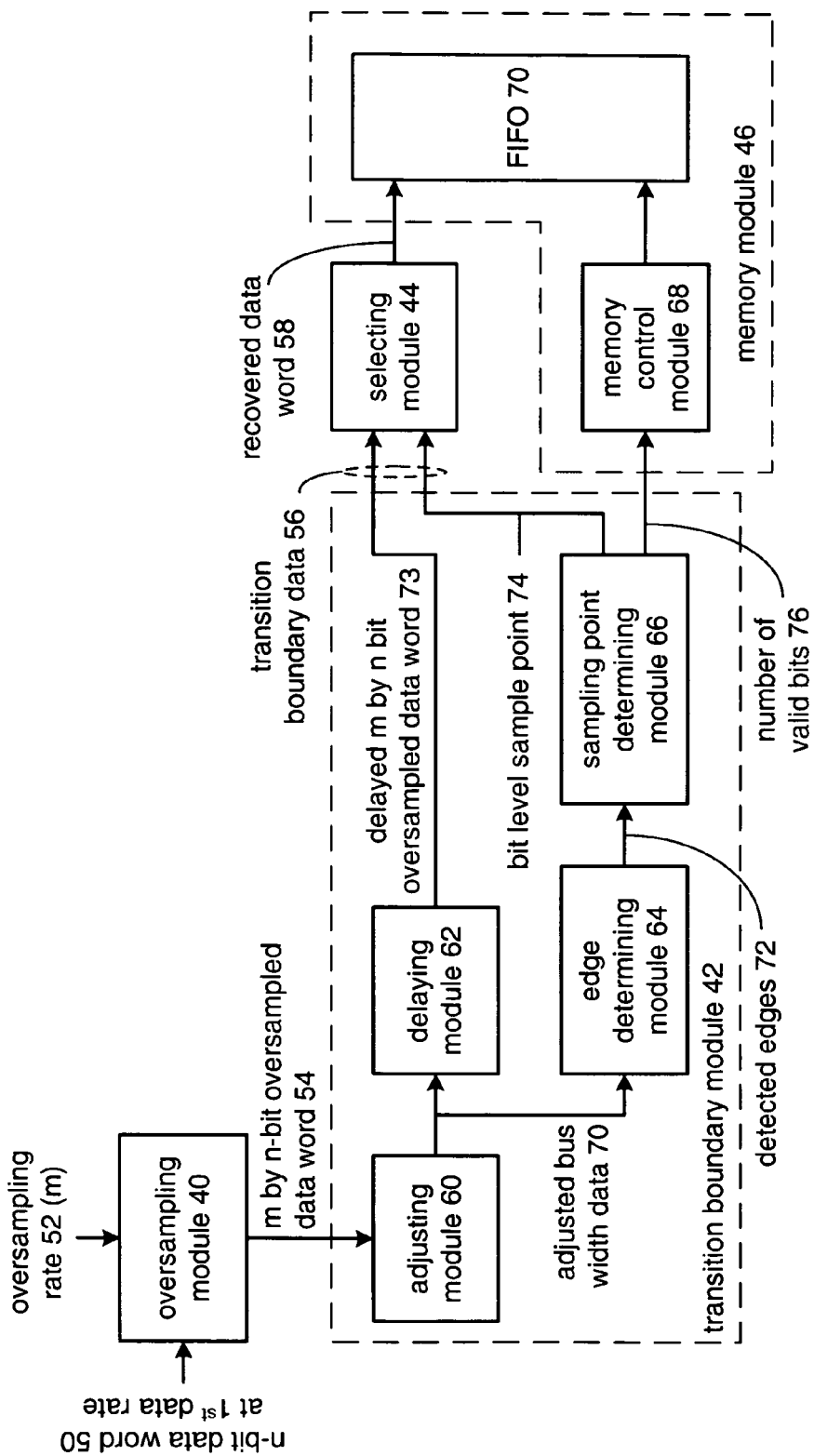
FIG. 4 is a schematic block diagram of yet another high-speed transceiver in accordance with the present invention.

FIG. 4 is a schematic block diagram of another embodiment of the high-speed transceiver 20 that includes the oversampling module 40, the transition boundary module 42, the selecting module 44, and the memory module 46. The transition boundary module 42 includes an adjusting module 60, a delaying module 62, an edge determining module 64, and a sampling point determining module 66. The memory module 46 includes a memory control module 68 and a first in first out (FIFO) buffer 70, which may be a variable input FIFO.

In operation, the adjusting module 60 receives the m by n-bit oversampled data word 54 from the oversampling module 40 and adjusts formatting of the m by n-bit oversampled data word 54 based on the bus width of the high speed transceiver 20. In one embodiment, the adjusting module 60 adjust bus width set up based on the oversampling rate and a number of bits in the m by n bit oversampled data word to produce adjusted bus width data 70. For example, if the m by n-bit oversampled data word 54 is 20-bits wide and the internal bus of the aligning module 42 is 25 bits, the adjusting module 60 creates a 21-bit word for 3× oversampling, a 24-bit word for 4× oversampling, and a 25-bit word for 5× oversampling. The adjusting module 60 will be further described with reference to FIGS. 5 and 6.

The edge determining module 64 is operably coupled to detect transition edges of the adjusted bus width data 70 to produce detected edges 72. The edge determining module 64 will be described in greater detail with reference to FIGS. 5 and 7.

The sampling point determining module 66 processes the detected edges 72 to produce a bit level sampling point 74 and a number of valid bits indication 76. The sampling point determining module 66 will be described in greater detail with reference to FIGS. 5 and 8A-10.

The delaying module 62 delays the adjusted bus width data 72 based on the processing rate of the edge detection module 64 and the sampling point determining module 66 to produce delayed m by n oversampled data 73. The delayed m by n bit oversampled data 73 in combination with the bit level sampling point 74 constitute the transition boundary data 56. The delaying module 62 will be described in greater detail with reference to FIG. 5.

The selecting module 44 samples the delayed m by n bit oversampled data word 73 based on the bit level sampling point 74 to select representative bits of the aligned bits to produce the recovered data word 58. The selecting module 44 will be described in greater detail with reference to FIGS. 5 and 11-16.

The memory control module 68 receives the number of valid bits indication 76 to control storing of the recovered data word 58 in the FIFO 70. Note that the recovered data word 58 is at a rate corresponding to the first data rate of the n-bit data word 50. The memory module 46 will be described in greater detail with reference to FIGS. 5 and 17.

Figure 5:
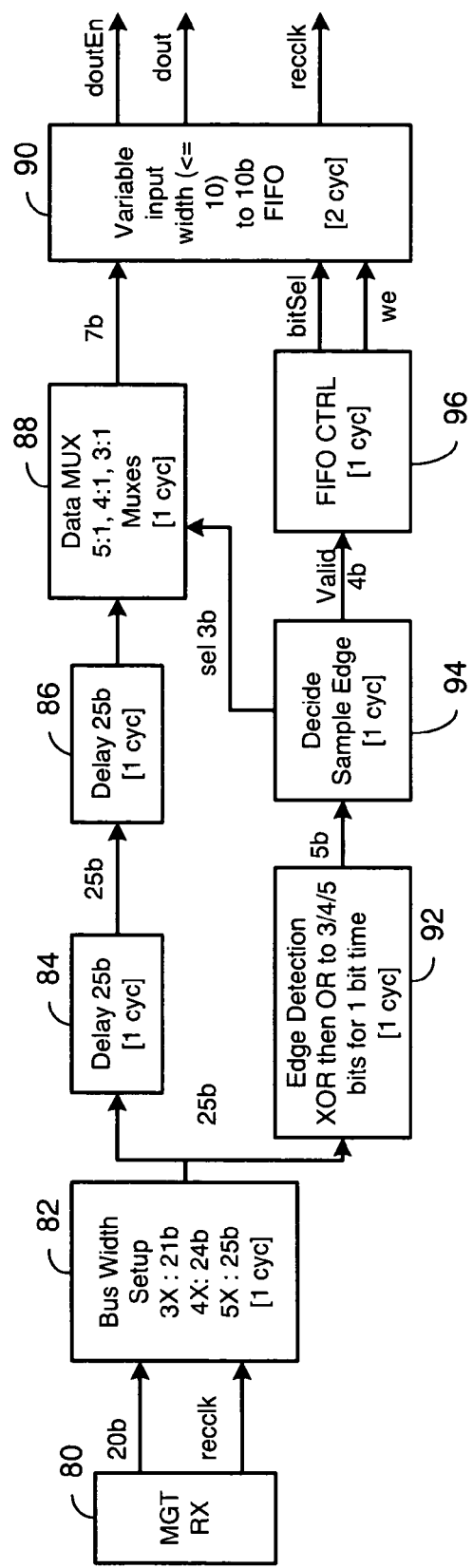
FIG. 5 is a schematic block diagram of an embodiment of a high-speed transceiver in accordance with the present invention.

FIG. 5 is a schematic block diagram of an embodiment of a high-speed transceiver 20 that includes at least a portion of an MGT 80 (multi gigabit transceiver), a bus width set up module 82, a first delay module 84, a second delay module 86, a data multiplexer (MUX) selection module 88, a variable input width FIFO 90, an edge detection module 92, a sampling edge decision module 94, and a FIFO control module 96.

Figure 6:
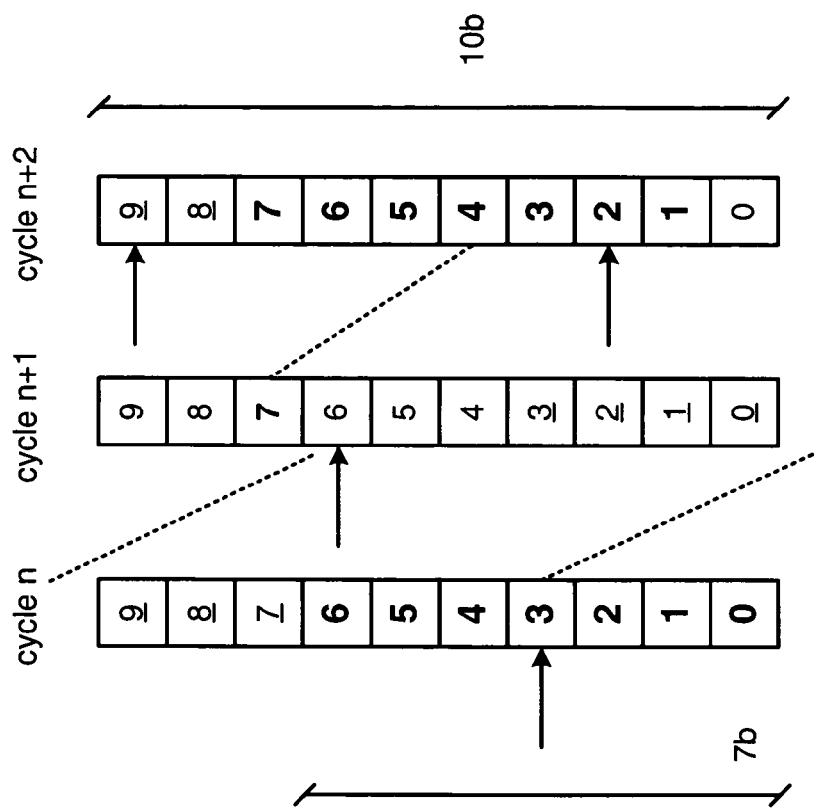
FIG. 6 is a diagram of an example of bus width adjustment in accordance with the present invention.

In general, the MGT 80 transmits over-sampled raw data to the over-sampling circuitry (e.g., modules 82-96) along with a recovered clock (recclk). Depending on the over-sampling ratio (e.g. 3×, 4×, 8×, 11×), the data bus is set up for subsequent processing via the bus width set up module 82. For example, the oversampled data may be 20-bits in width and the bus width set up module 82 generates adjusted words for a 25 bit bus. Accordingly, for 3× oversampling, the bus width set up module 82 generates a 21-bit word from which bits can be selected and the remaining four bits are not used or the data is allowed to drift. When the data drifts, as will be further described with reference to FIG. 15, 18 bits (e.g., bits 17 to 0) are used for a first oversampled data word of a first cycle. The MSB 2 bits (bits 19 and 18) are ignored because they have been accounted for in the previous cycle. The LSB bit (also bit 19, which is bit 19 for the next raw oversampled data word) is used for next cycle's consideration. As such, drifting of the data accommodates the situation when data width does not match the bus width of the transceiver. In FIG. 6, for example, the example bus width is 10 bits, but the oversampling module is 7×. If 2 bits are sampled in one cycle, then 14 bits are accounted for when only 10 bits are present. This is achieved since 4 bits are over accounted for, the sample point will drift by 4 bits to match the data boundary.

Continuing with the example of the bus width set up module 82, the module 82 sets up the bus as a 24 bit bus. In this instance, every cycle 5 bits are extracted (e.g., 20/4). Due to data and clock jitter, the data boundaries can shift (or roll) to the LSB or the MSB position, which can result in LSB or MSB roll over. The extra 4 bits are used to accommodate the LSB or MSB roll over. For 5× oversampling, the bus width set up module 82 generates a 25-bit word. In this instance, the data does not drift since the word size matches the bus width. Note that, in some embodiments, the bus width may be in the range of 10 bits to 64 bits.

The edge detection module 92 determines the location of the transition point of the data received from the bus width set up module 25. In the example embodiment shown, the edge detection may be done by an exclusive OR (XOR) function followed by an OR function to produce 3, 4, or 5 bits in a 1 bit time frame. In such an example, the OR function is providing compression of the data to a few bits, which enables the decide sampling edge module 94 to process the data more efficiently with minimal use of the programmable logic fabric of an FPGA. A further example of the edge detection will be described in greater detail with FIG. 7.

The decide sampling edge module 94 determines the location of the optimal sampling point, which is typically the point furthest away from data transitions. In this example, the sampling point is a 3 bit word (sel) that is provided to the data MUX module 88. The decided sampling edge module 94 also provides a 4-bit value (Valid) to the FIFO control module 96 to identify the number of bits to be stored in the FIFO 90.

To maintain the timing within the high-speed transceiver, the first and second delay modules 84 and 86, delay the data provided by the bus width set up module 82 by two cycles: one per module. In other words, the data is delayed to match the decision logic of the edge detection module 92 and the sample edge (or point) determining module 94. As such, the data MUX module 88 is enabled to make an optimal decision for the particular incoming data sets to produce the recovered data to provide the FIFO 90.

Since the over-sampling ratio may not match the data bus width of the high speed transceiver (e.g., when the oversampling is 3× or 4×) and since recclk is often not frequency locked to the incoming data, the FIFO 90 includes a variable width input. For example, for 3× oversampling, seven input bits are converted to a 21-bit oversampled data word, which, with data drift, may yield a 6 or 7 bit recovered word. As a further example, for 4× oversampling, 4, 5, or 6 bits may be recovered, with 5 bits being more typical. As yet a further example, for 6× oversampling, 3, 4, or 5 bits may be recovered. Accordingly, the input of the FIFO is adjustable to accommodate the varying input widths. Note that, in this embodiment, the output of the FIFO has a fixed data output bus width (dout), a data enabled output (doutEn), and a clock output (recclk).

The output of the FIFO 90 may be provided to backend logic of a programmable logic device, which processes the data based on dout, doutEn and the recclk. Alternatively, the backend logic can transfer the data into a system clock domain before further processing is performed.

In order to achieve a desired maximum operating frequency, low pipeline data path latency and a desired minimum FPGA resource utilization, the sampling decision module 94 and the variable input width FIFO control module 96 may be mapped into FPGA's embedded SRAM (e.g., block RAM or BRAM). By embedding sampling decision logic into BRAM, it is possible to support software-like, complex control logic at speeds matching the RECCLK speeds (ranging from 50-160 MHz). It also allows the module to easily switch from one over-sampling ratio to the next. This will be convenient for interfaces that need to support varying speeds using different over-sampling ratios, for example, video's DVI interface which is 250 Mbps to 1.6 Gbps. 250 Mbps to 1 Gbps can be supported by using 3× and 5× over-sampling. Another application is SONET's OC-30C-12 and OC-48 (155 Mbps, 622 Mbps and 2.488 Gbps respectively). OC-3 can be supported by 10 or 20× over-sampling, OC-12 supported by 5× over-sampling and OC-48 by MGT's native speed.

FIG. 6 is a diagram of an example of bus width adjustment that may be performed by the adjusting module 60 and/or the bus width set up module 82. In this example, the m by n bit oversampled data word 54 is 10 bits wide and the oversampling is 7×. For each cycle (cycle n, cycle n+1, cycle n+2), the center of the data "drifts" by 4 bit positions. The decision logic will keep track of the drift and make appropriate sampling point selection decisions (as indicted by the arrows). This allows the physical data path to be fixed (e.g., 10-64 bits) and, by modifying how the decision logic accounts for the drift, different over-sampling ratios can be applied.

Figure 7:
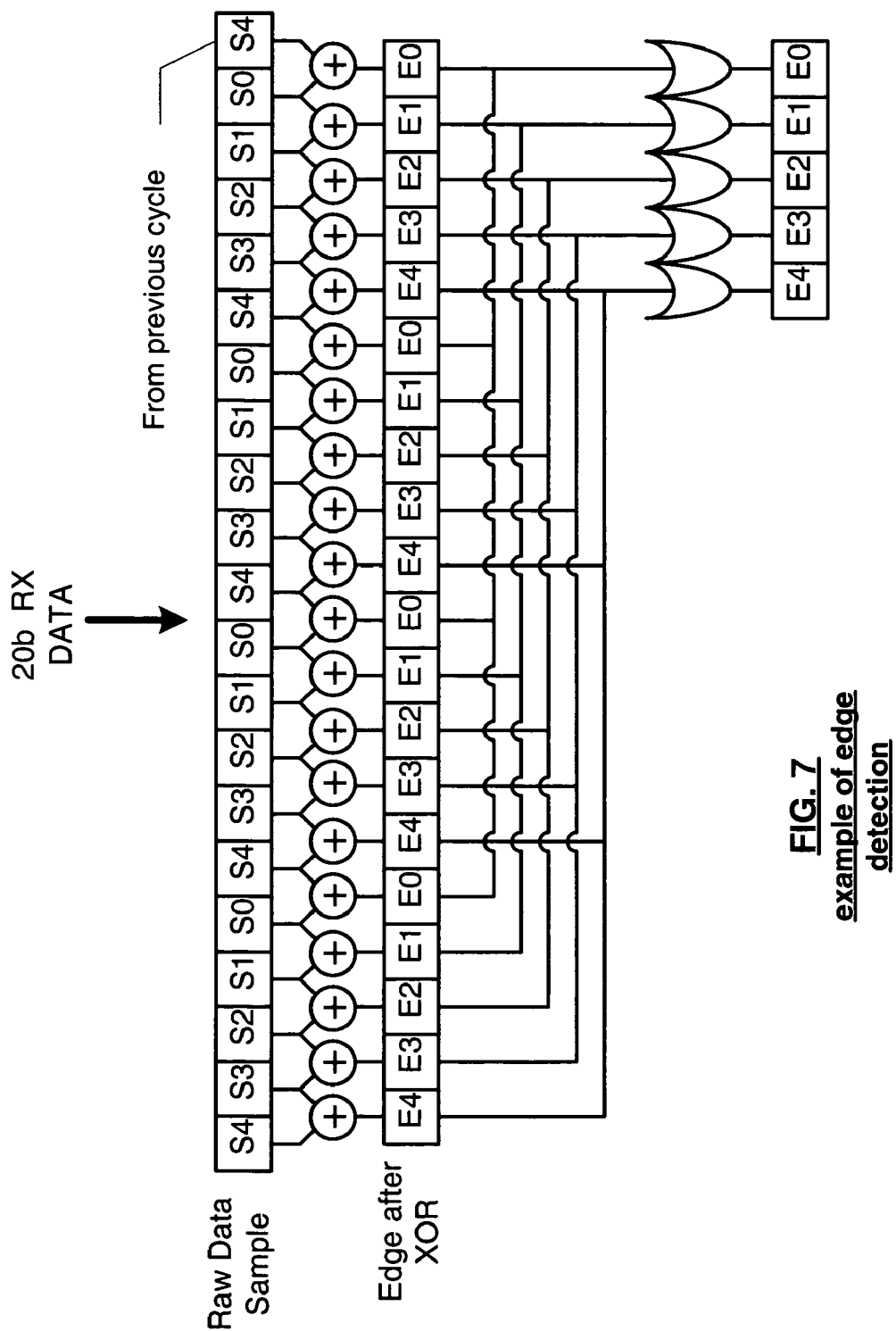
FIG. 7 is a diagram of an example of edge detection in accordance with the present invention.

FIG. 7 is a diagram of an example of edge detection which may be included in the edge determining module 64 and/or the edge detection module 92. In this example, 20 bits of data are received via the bus adjusting module 60 and/or 82, which produces a 25 bit word. The 20 bits of the input data are mapped into a plurality of registers (S0-S4), where consecutive bits are exclusively ORed to produce XOR data. The exclusive ORing detects "01" and "01" transitions between adjacent bits. The 20 bits of XOR data is stored in registers (E0-E4). Amongst these 20 bits, many bits carry the same information and can be ORed. For example, for a 5× oversampling, data bits should appear in groups of 5 bits. Therefore, every other 5 bits carry the same information and can be ORed to reduce the amount of data that needs to be processed. The resulting ORed data represents the transition edges of the received data.

FIGS. 8A and 8B are diagrams of an example of a vector approach to determining the sampling point that may be performed by the sampling point determining module 66 and/or the decide sampling edge module 94. In this example, a vector approach is used to determining the sampling point. Such an approach is generally well suited for oversampling rates between 3× to 8×, but can be extended to other sampling rates. In this example, a 5× oversampling rate is represented.

In general, the vector approach looks at transitions at all (or near all) of the possible locations at one glance. Based on the position of the transition edges, the data sampling point is determined to be the point that is furthest away from the transition point. As shown in FIG. 8A, a data transition falls between S0 and S4. Thus, the optimal sampling location is S2. As shown in FIG. 8B, the data transition falls between S2 and S1, with S4 being the optimal sampling location.

In practice, multiple transitions can also occur with jittery data. In this instance the sampling point determining module measures the distance from the "assumed position" (based on previous cycle) to the left hand side and right hand side transition points. In FIG. 9, data transition happens between S3 and S4, thus the sampling position is S1. In the next cycle, the assumed position is S1. Distances from S1 to the transitions are compared. Since the left hand side has more distance than the right hand side, the sampling position is moved from S1 to S2.

Figure 10:
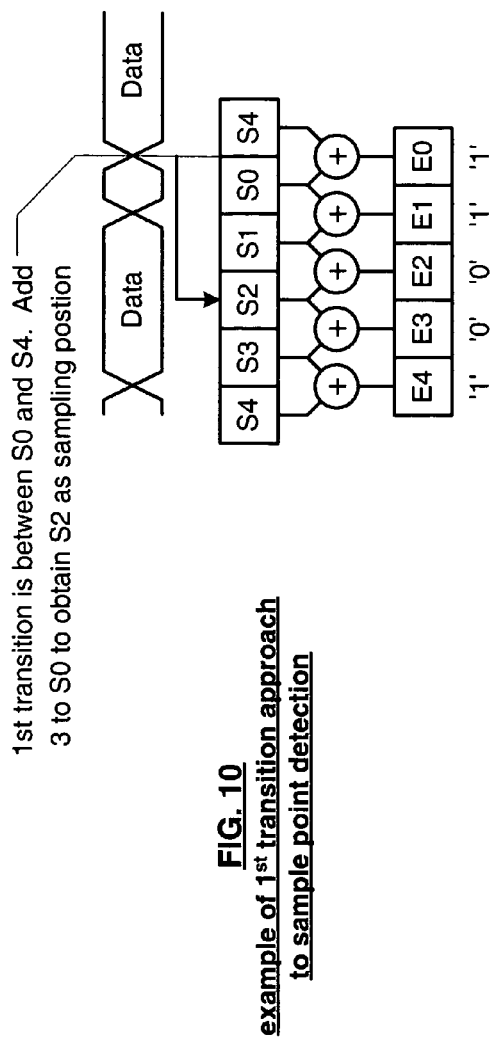
FIG. 10 is a diagram of an example of a first transition approach to determining the sampling point in accordance with the present invention.

FIG. 10 is a diagram of an example of a first transition approach to determining the sampling point as may be performed by the sampling point determining module 66 and/or the decide sampling edge module 94. In this example, which may be used for higher oversampling rates (e.g., greater than or equal to 7×), the module 66 and/or 94 finds the first occurrence of the transition edge and add an offset value to determine the data sampling position.

As shown, the first transition occurs at E0. Therefore E0+3−1 (−1 because 0 is the first element) indicates that S2 is the optimal sampling position. With higher over-sampling rates, in order to quickly acquire data, cycle to cycle sampling movement may be restricted, or limited, to half the over-sampling ratio. With the case of 8× over-sampling, maximum jump per cycle is 4.

Figure 11:
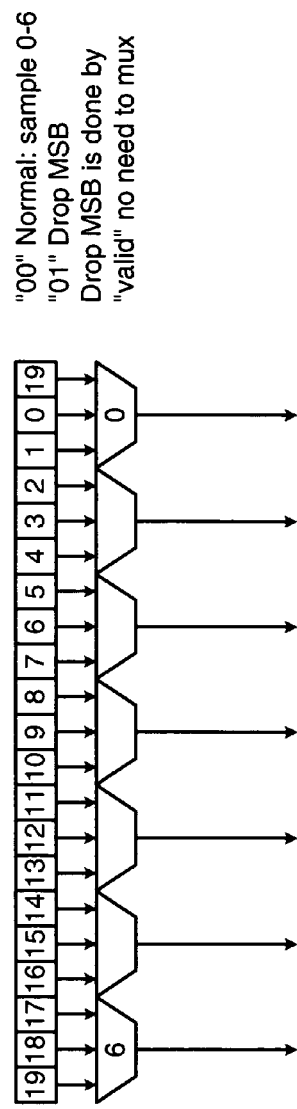
FIG. 11 is a schematic block diagram of a 3× oversampling data selection multiplexer of a selecting module in accordance with the present invention.

FIG. 11 is a schematic block diagram of a 3× oversampling data selection multiplexer of a selecting module 44 and/or of the decide sample edge module 94. In this embodiment, the module 44 and/or 94 provides data rollover control and sets up the data MUX. For instance, since the over-sampling ratio may not be even divisors of the RXDATA bus width and since RECCLK clock is not frequency locked to the serial data stream, the number of valid bits extracted per RECCLK cycle will vary. As such, the sampling point can roll to the MSB (most significant bit) edge or the LSB (least significant bit) edge.

Figure 14:
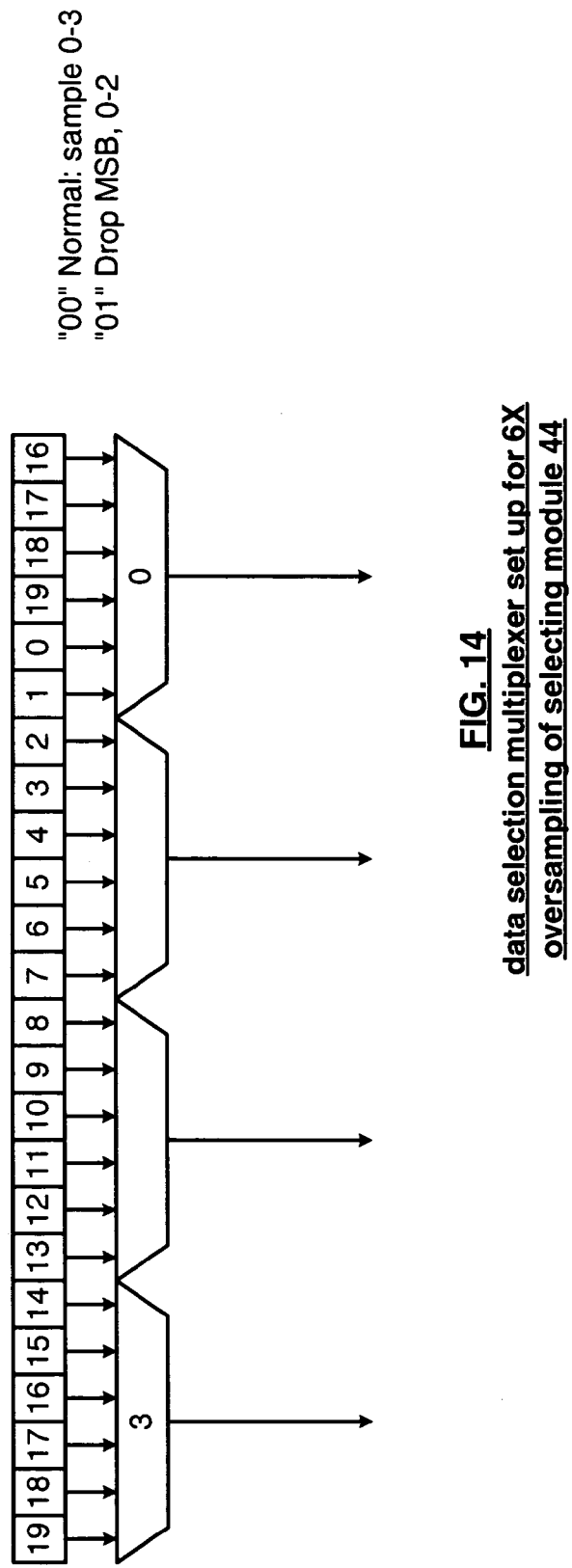
FIG. 14 is a schematic block diagram of a 6× oversampling data selection multiplexer of a selecting module in accordance with the present invention.

To accommodate the varying data edges, two layers of data path control are applied. The first layer is a data mux that is setup based on the over-sampling ratio. FIG. 11 shows the set up for 3× oversampling, FIG. 12 shows the set up for 4× oversampling, FIG. 13 shows the set up for 5× oversampling, and FIG. 14 shows the set up for 6× oversampling. In these embodiments, only 1 bit of data in the bit group may be selected and forwarded to the backend user side (e.g., the FIFO). The second layer of data path control determines how many bits are valid. The muxing and the data selection scheme is setup where the LSB output bits are valid. When bits need to be discarded, the MSB mux outputs are discarded.

Figure 15:
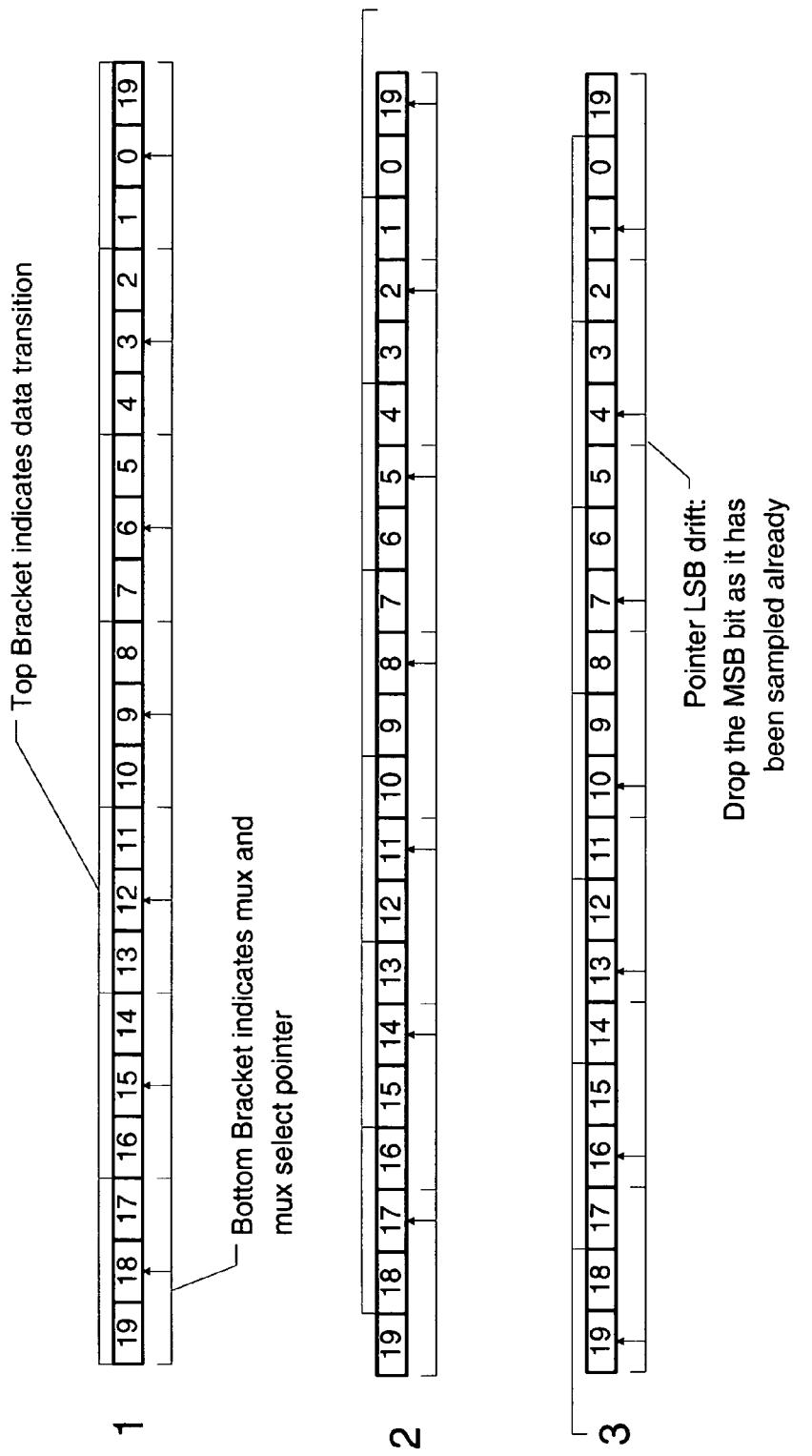
FIG. 15 is a diagram of an example of 3× oversample selection with data drift within the selecting module in accordance with the present invention.

FIG. 15 illustrates the operation of a 3× over-sampling pointer movement of the sampling point selection module 44 and/or the decide sample edge module 94. In cycle 1, the mux select samples the middle bit of the 7 bit groups. These bits are passed to the back end (e.g., the FIFO). In cycle 2, because 7×3=21 bits have already been accounted for and RXDATA bus width is 20, data transition "drifts" by one bit (21−20=1). Now, the mux select samples the right bit of the bit group. Another 7 bits are sampled. In cycle 3, the bit pointed by the MSB mux select (the $7^{th}$ mux select) has already been sampled, so only 6 bits are extracted. Mux select points to the left bit of the bit group.

Figure 16:
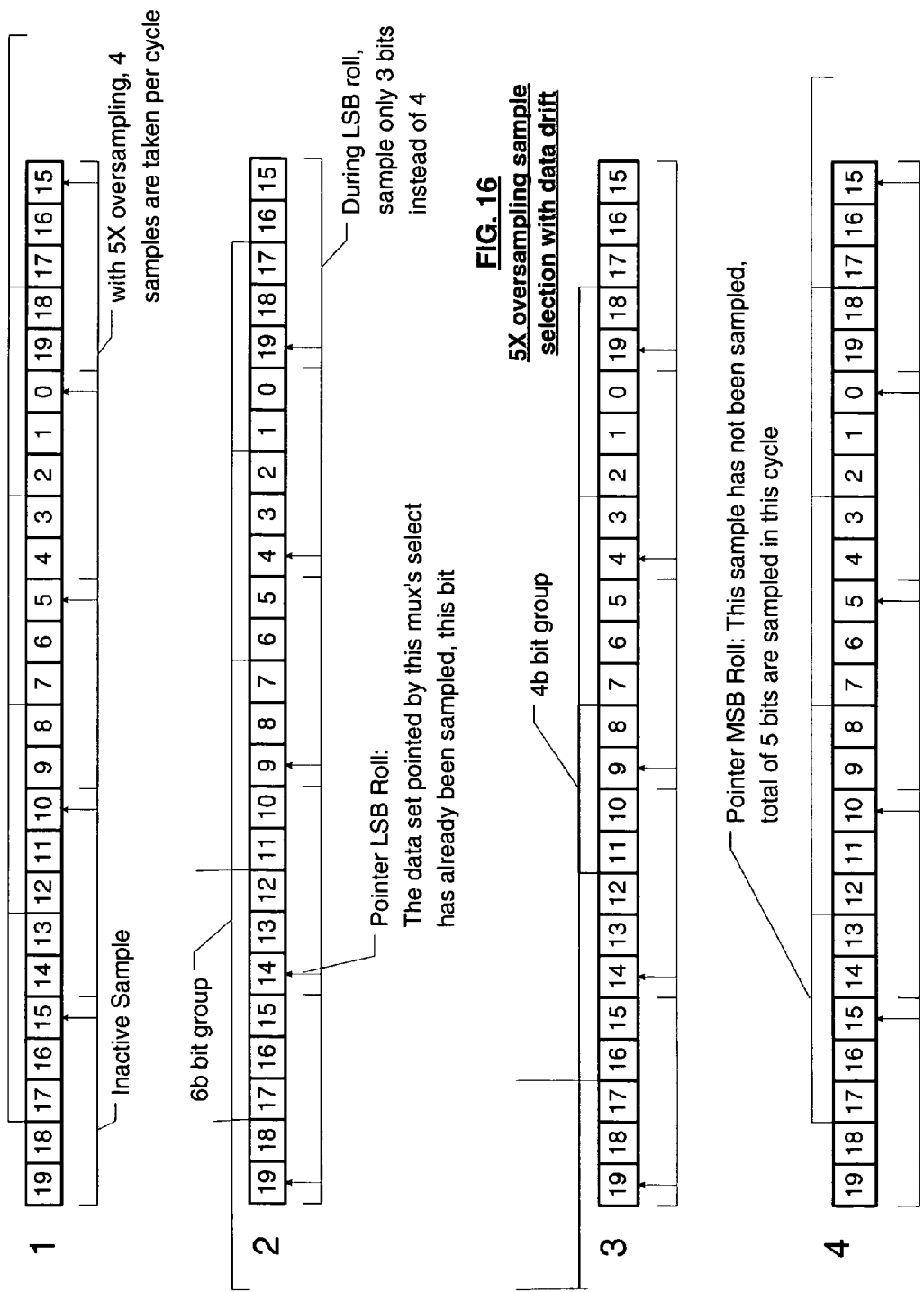
FIG. 16 is a diagram of an example of 5× oversample selection with data drift within the selecting module in accordance with the present invention.

FIG. 16 is a diagram of an example of 5× oversample selection with data drift within the selecting module 44 and/or the edge detection module 92. In this example, a 5× over-sampling is illustrated with LSB and MSB direction transitions wandering. In cycle 1, 4 bits are extracted (20 RXDATA bits/5 time over-sampling=4 valid bits per cycle). The mux select is pointing at the LSB bit. In cycle 2, one of the bit groups has 6 bits (positions 17 to 12). This forces the mux select to shift from the LSB position to the MSB (left most) position. This is referred to as LSB to MSB roll (or LSB roll in short). The data covered by the 2 left most mux outputs have already been selected, therefore only 3 bits are valid in cycle 2. In cycle 3, one of the bit groups is a 4 bit group (positions 11 to 8), while this did not cause the alignment to change in this cycle, it will cause the alignment to change in cycle 4. In cycle 4, the mux select signal jumps from the MSB position to the LSB position (MSB roll). Since bits 17 to 15 of the MSB mux select group has not been covered, 5 bits are extracted during this cycle.

Figure 17:
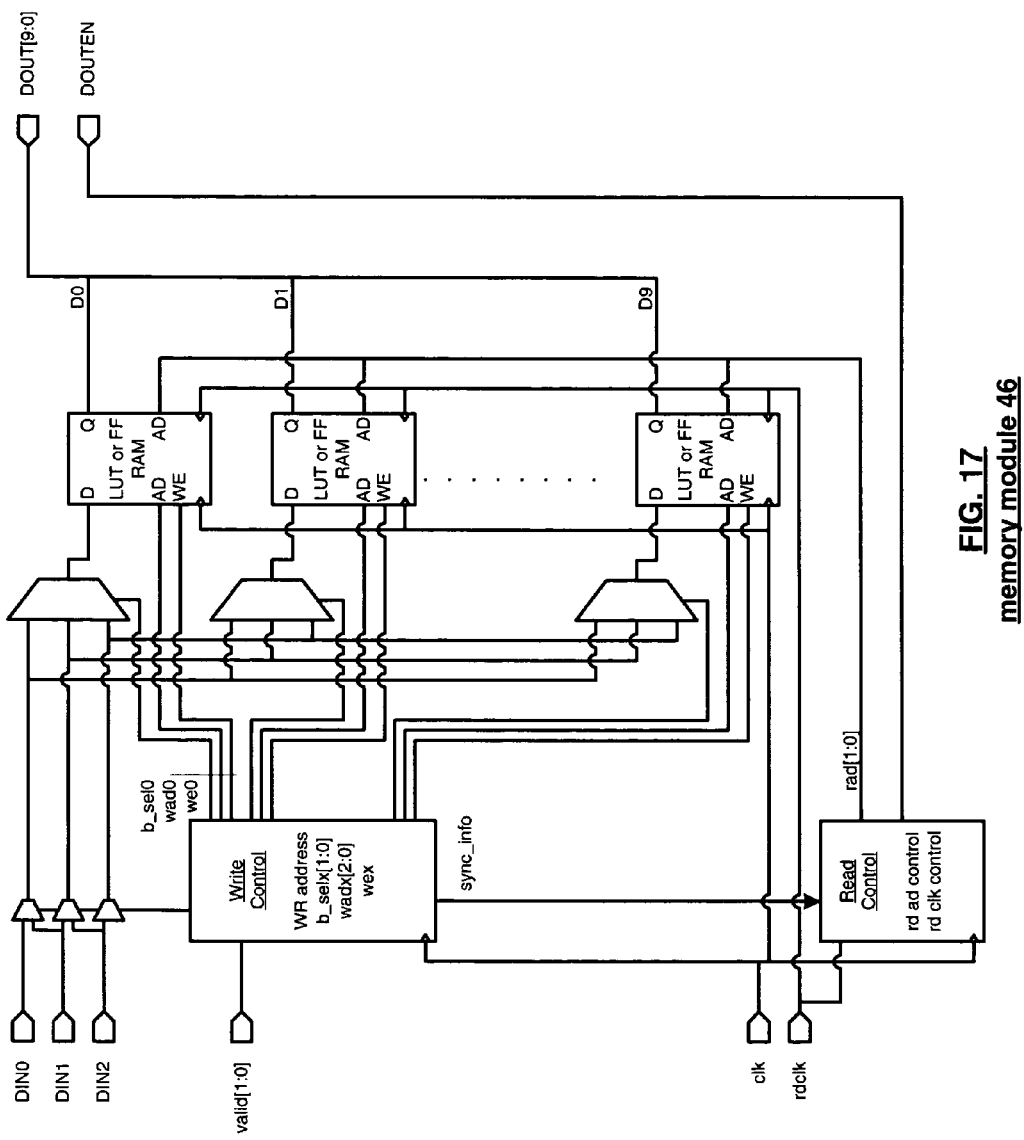
FIG. 17 is a schematic block diagram of a memory module in accordance with the present invention.

FIG. 17 is a schematic block diagram of an embodiment of the memory module 46 that includes a memory control circuits and memory cell circuits. The memory control circuits include a write control module, a read control module, and multiplexers. The memory cell circuits include a plurality of look up table (LUT) memory devices and/or flip flop (FF) memory.

In operation, since the number of valid bits varies from cycle to cycle, the memory module 46 includes a variable input width input structure that converts variable sized input to fixed width outputs. In this embodiment, inputs are up to 3 bits and a data valid signal which can be from 0 to 3. The output is a 10 bit bus with an optional DOUT Enable (DOUTEN). The DOUTEN is not needed if RDCLK is frequency locked to the data rate and is used to read data out of the RAM. If RDCLK is not used and instead CLK is used to read the data out, then DOUTEN is used to indicate when the 10 bits of data are collected and ready to output. Each of the storage element (LUT or FF based) can accept data from any one of the 3 bits of DIN. Which storage element should be written to is controlled by the dedicated WE (Write Enable) signal going to each storage element. Which one of the 3 DIN bits to write into the controlled by B_SEL signal.

For LUT implementation, each LUT can store up to 16 bits. An 8 bit deep example is shown here where WAD for each LUT RAM is 3 bits wide. For FF based implementation, each RAM can be 2 FFs deep. Instead of having 3 bits of address select and 1 bit of WE, there will be 1 enable bit for each FF which will function as both WE and WAD.

For 3× over-sampling design with 20 b RXDATA, the input bus varies from 6 to 7 valid bits. Each storage element will have a 7 to 1 mux select. FF implementation is used and data is written into and read out of the FF using RECCLK. DOUTEN is used to indicate valid bits.

Figure 18:
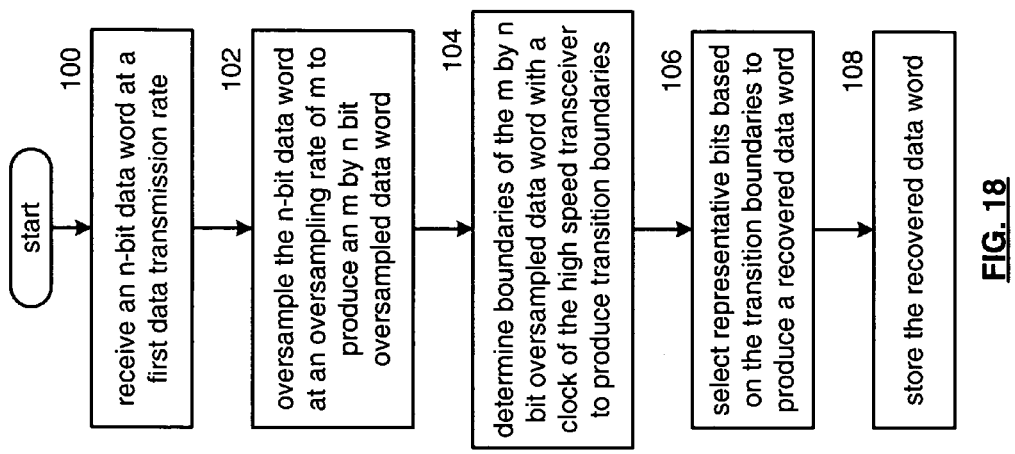
FIG. 18 is a logic diagram of a method for using a high speed transceiver to receive lower data rate transmissions in accordance with the present invention.

FIG. 18 is a logic diagram of a method for using a high speed transceiver to receive lower data rate transmissions, which at least a portion of the method may be programmed into the programmable fabric of the programmable logic device 10 and/or other processing device. The method begins at step 100, where an n-bit data word is received at a first data transmission rate. The first data transmission rate is less than a serial bit rate of the high speed transceiver. The method continues at step 102 where the n-bit data word is over-sampled at an oversampling rate of m to produce an m by n bit oversampled data word.

The method continues at step 104 where transition boundaries of the m by n bit oversampled data word are determined in accordance with a clock of the high speed transceiver to produce transition boundary data. In one embodiment, the determining of the transition boundary data may be done by determining edges of the m by n bit oversampled data word to produce detected edges; determining a bit level sampling point of the m by n bit oversampled data word based on the detected edges; and delaying the m by n bit oversampled data word based on processing time to determine the detected edges and to determine the bit level sampling point to produce a delayed m by n bit oversampled data word.

The method then continues at step 106 where representative bits are selected in accordance with the transition boundary data to produce a recovered data word. In one embodiment, the delayed m by n bit oversampled data word may be sampled in accordance with the bit level sample point to produce the representative bits. The process then proceeds to step 108 where the recovered data word is stored.

As one of average skill in the art will appreciate, the term "substantially" or "approximately", as may be used herein, provides an industry-accepted tolerance to its corresponding term. Such an industry-accepted tolerance may range, for example, from less than one percent to twenty percent and may correspond to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for a high-speed transceiver to receive lower data rate transmissions without the need for substantial external circuitry. As one of average skill in the art will appreciate, other embodiments may be derived from the teaching of the present invention without deviating from the scope of the claims.

We claim:

1. A method for using a high speed transceiver to receive lower data rate transmissions, the method comprises:
    receiving an n-bit data word at a first data transmission rate, wherein the first data transmission rate is less than a serial bit rate of the high speed transceiver;
    oversampling the n-bit data word at an oversampling rate of m to produce an m by n bit oversampled data word;
    determining transition boundary data of the m by n bit oversampled data word in accordance with a clock of the high speed transceiver to produce transition boundary data;
    selecting representative bits in accordance with the transition boundary data to produce a recovered data word; and
    storing the recovered data word;
    wherein the determining the transition boundary data of the m by n bit oversampled data word comprises:
        determining edges of the m by n bit oversampled data word to produce detected edges;
        determining a bit level sampling point of the m by n bit oversampled data word based on the detected edges; and
        delaying the m by n bit oversampled data word based on processing time to determine the edges and determine the bit level sampling point to produce a delayed m by n bit oversampled data word.

2. The method of claim 1, wherein the selecting the representative bits comprises:
    sampling the delayed m by n bit oversampled data word in accordance with the bit level sample point to produce the representative bits.

3. The method of claim 1, wherein the determining edges of the m by n bit oversampled data word comprises:
    exclusive ORing consecutive bits of the m by n oversampled data word to produce exclusive ORed bits; and
    ORing groups of the exclusive ORed bits to determine the edges of the m by n bit oversampled data word.

4. The method of claim 1, wherein the determining the bit level sampling point of the m by n bit oversampled data word comprises:
    determining bit position of a first edge of the m by n bit oversampled data word;
    determining bit position of a second edge of the m by n bit oversampled data word; and
    selecting a bit position as the bit level sampling point based on the first and second edges of the m by n bit oversampled data word.

5. The method of claim 4 further comprises:
    from m by n bit oversampled data word to m by n bit oversampled data word, limiting adjustment of the bit level sampling point to a set number of bit positions.

6. The method of claim 1, wherein the determining the bit level sampling point of the m by n bit oversampled data word comprises:
    determining bit position of an edge of the m by n bit oversampled data word; and
    selecting a bit position as the bit level sampling point based on the edge of the m by n bit oversampled data word and a bit position offset.

7. The method of claim 1, wherein the selecting representative bits comprises:
    controlling data rollover of the m by n bit oversampled data word based on the oversampling rate and bus width of the high speed transceiver to produce rollover controlled oversampled data word; and
    determining valid bits of the rollover controlled oversampled data word to produce the representative bits.

8. The method of claim 1, wherein the selecting the representative bits comprises:
    setting up a data multiplexer module based on the oversampling rate to select the representative bits from the aligned bits; and
    determining valid bits of the representative bits based on data drift.

9. The method of claim 1, wherein the storing recovered data word comprises:
    storing the recovered data word in a variable input width first in first out buffer.

10. The method of claim 1 further comprises:
    adjusting bus width set up based on the oversampling rate and a number of bits in the m by n bit oversampled data word prior to the aligning the bits of the m by n bit oversampled data word.

11. A high speed transceiver operable to receive lower data rate transmissions, the high speed transceiver comprises:
    an oversampling module operably coupled to oversample an n-bit data word at an oversampling rate of m to produce an m by n bit oversampled data word, wherein the n-bit data word is received at a first data transmission rate, wherein the first data transmission rate is less than a serial bit rate of the high speed transceiver;
    a transition boundary module operably coupled to determine transition boundary data of the m by n bit oversampled data word in accordance with a clock of the high speed transceiver to produce transition boundary data;
    a selecting module operably coupled to select representative bits in accordance with the transition boundary data to produce a recovered n-bit data word; and
    memory module for storing the recovered data word;
    wherein the transition boundary module comprises:
        an edge determining module operably coupled to determine edges of the m by n bit oversampled data word to produce detected edges;
        a sampling point determining module operably coupled to determine a bit level sampling point of the m by n bit oversampled data word based on the detected edges; and
        a delaying module operably coupled to delay the m by n bit oversampled data word based on processing time to determine the edges and determine the bit level sampling point to produce a delayed m by n bit oversampled data word.

12. The high speed transceiver of claim 11, wherein the selecting module is further functional to:
    sample the delayed m by n bit oversampled data word in accordance with the bit level sample point to produce the representative bits.

13. The high speed transceiver of claim 11, wherein the edge determining module comprises:
- an exclusive OR module operably coupled to exclusive OR consecutive bits of the m by n oversampled data word to produce exclusive ORed bits; and
- an OR module operably coupled to OR groups of the exclusive ORed bits to determine the edges of the m by n bit oversampled data word.

14. The high speed transceiver of claim 11, wherein the sampling point determining module comprises:
- programming a portion of a programmable logic to device to:
  - determine bit position of a first edge of the m by n bit oversampled data word;
  - determine bit position of a second edge of the m by n bit oversampled data word; and
  - select a bit position as the bit level sampling point based on the first and second edges of the m by n bit oversampled data word.

15. The high speed transceiver of claim 14, wherein the sampling point determining module further functions to:
- limit, from m by n bit oversampled data word to m by n bit oversampled data word, adjustment of the bit level sampling point to a set number of bit positions.

16. The high speed transceiver of claim 11, wherein the sampling point determining module functions to:
- determine bit position of an edge of the m by n bit oversampled data word; and
- select a bit position as the bit level sampling point based on the edge of the m by n bit oversampled data word and a bit position offset.

17. The high speed transceiver of claim 11, wherein the selecting module functions to:
- control data rollover of the m by n bit oversampled data word based on the oversampling rate and bus width of the high speed transceiver to produce rollover controlled oversampled data word; and
- determine valid bits of the rollover controlled oversampled data word to produce the representative bits.

18. The high speed transceiver of claim 11, wherein the selecting module comprises:
- a data multiplexer module that is set up based on the oversampling rate to select the representative bits from the m by n bit oversampled data word; and
- a bit determining module operably coupled to determine valid bits of the representative bits based on data drift.

19. The high speed transceiver of claim 11, wherein the memory module comprises:
- first in first out buffer for storing the recovered data word; and
- memory control module for controlling storage in the first in first out buffer based on variable widths of the recovered data.

20. The high speed transceiver of claim 19, wherein the first in first out buffer comprises at least one of:
- look up table memory cells for storing bits of the recovered n-bit data word; and
- flip flop memory cells for storing the bits of the recovered n-bit data word.

21. The high speed transceiver of claim 20, wherein the variable input width first in first out buffer comprises at least one of:
- memory of a programmable logic device configured to provide at least one of the look up table memory cells and the flip flop memory cells.

22. The high speed transceiver of claim 19 further comprises:
- programming a portion of a programmable logic device to function as the memory control module.

23. The high speed transceiver of claim 11, wherein the aligning module comprises:
- an adjusting module operably coupled to adjust bus width set up based on the oversampling rate and a number of bits in the m by n bit oversampled data word.

* * * * *